US011051258B2

(12) United States Patent
Zhang et al.

(10) Patent No.: US 11,051,258 B2
(45) Date of Patent: Jun. 29, 2021

(54) TECHNIQUES FOR SIGNALING AND CHANNEL DESIGN IN NEW RADIO

(71) Applicant: QUALCOMM Incorporated, San Diego, CA (US)

(72) Inventors: Xiaoxia Zhang, San Diego, CA (US); Taesang Yoo, San Diego, CA (US); Juan Montojo, San Diego, CA (US); Tao Luo, San Diego, CA (US); Zhifei Fan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 117 days.

(21) Appl. No.: 15/802,191

(22) Filed: Nov. 2, 2017

(65) Prior Publication Data
US 2018/0124726 A1 May 3, 2018

Related U.S. Application Data

(60) Provisional application No. 62/417,036, filed on Nov. 3, 2016.

(51) Int. Cl.
H04W 56/00 (2009.01)
H04L 27/26 (2006.01)
H04W 72/04 (2009.01)

(52) U.S. Cl.
CPC ....... H04W 56/0005 (2013.01); H04L 27/261 (2013.01); H04L 27/2692 (2013.01); H04W 72/0453 (2013.01)

(58) Field of Classification Search
CPC .......... H04W 56/0005; H04W 72/0453; H04L 27/261; H04L 27/2692
See application file for complete search history.

(56) References Cited

U.S. PATENT DOCUMENTS

| 2010/0027492 | A1  | 2/2010  | Asanuma |
|---|---|---|---|
| 2010/0110873 | A1* | 5/2010  | Han .................... H04L 27/2613 370/208 |
| 2016/0072614 | A1  | 3/2016  | Blankenship et al. |
| 2016/0080127 | A1* | 3/2016  | Liu ................... H04W 72/0453 370/329 |
| 2016/0316442 | A1* | 10/2016 | Seo ....................... H04W 56/00 |

(Continued)

FOREIGN PATENT DOCUMENTS

WO     2016070427 A1    5/2016
WO  WO-2016/182602 A1  11/2016
(Continued)

OTHER PUBLICATIONS

ZTE, "Synchronization Design for D2D Broadcast Communication," Feb. 2014, 3Gpp TSG-RAN WG1 #76, R1-140269.*
(Continued)

Primary Examiner — Will W Lin
(74) Attorney, Agent, or Firm — Arent Fox, LLP

(57) ABSTRACT

Various aspects described herein relate to techniques for signaling and channel design in wireless communications systems (e.g., a 5G NR system). In an aspect, a method includes identifying a direct current (DC) subcarrier of a synchronization bandwidth, determining whether a synchronization signal transmits on, punctures, or rate matches around the DC subcarrier, and performing synchronization channel processing based on the determination.

18 Claims, 7 Drawing Sheets

(56) References Cited

U.S. PATENT DOCUMENTS

| | | | | |
|---|---|---|---|---|
| 2017/0012753 | A1* | 1/2017 | Kim | H04W 56/002 |
| 2017/0245278 | A1* | 8/2017 | Xue | H04L 27/2602 |
| 2017/0311232 | A1* | 10/2017 | Yi | H04W 52/0229 |
| 2018/0035416 | A1* | 2/2018 | Yi | H04W 72/0406 |
| 2018/0109410 | A1* | 4/2018 | Kim | H04L 7/042 |
| 2019/0245724 | A1* | 8/2019 | Wang | H04L 27/2666 |
| 2019/0394003 | A1* | 12/2019 | Kim | H04W 76/14 |

FOREIGN PATENT DOCUMENTS

| | | |
|---|---|---|
| WO | WO-2017/018966 A1 | 2/2017 |
| WO | WO-2017/043878 A1 | 3/2017 |

OTHER PUBLICATIONS

International Search Report and Written Opinion—PCT/US2017/059941—ISA/EPO—dated May 14, 2018.

Panasonic: "Discussion on Physical Resource Block for NR Numerologies", 3GPP Draft; R1-167338, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 21, 2016 (Aug. 21, 2016), pp. 1-4, XP051140627, Retrieved from the Internet: URL:http://www.3gpp.org/ftp/Meetings_3GPP_SYNC/RAN1/Docs.

Zte et al., "Frequency Multiplexing of Numerologies", 3GPP Draft; R1-166492, 3rd Generation Partnership Project (3GPP), Mobile Competence Centre; 650, Route Des Lucioles; F-06921 Sophia-Antipolis Cedex; France, vol. Ran WG1, No. Gothenburg, Sweden; Aug. 22, 2016-Augs. 26, 2016, Aug. 21, 2016 (Aug. 21, 2016), pp. 8, XP051140260, Retrieved from the Internet: URL:http://www.3gpp.org/ftp/Meetings_3GPP_SYNC/RAN1/Docs.

Panasonic: "MTC Narrowband definition and collision handling", 3GPP Draft; R1-153960, 3rd Generation Partnership Project (3GPP), Mobile Competence Centre; 650, Route Des Lucioles; F-06921 Sophia-Antipolis Cedex, France, vol. Ran WG1, No. Beijing, China; (Aug. 24, 2015-Augs. 28, 2015) Aug. 23, 2015 (Aug. 23, 2015), XP051039358, 6 Pages, Retrieved from the Internet: URL:http://www.3gpp.org/ftp/Meetings_3GPP_SYNC/RAN1/Docs [retrieved on Aug. 23, 2015].

Partial International Search Report—PCT/US2017/059941—ISA/EPO—dated Feb. 13, 2018.

Zte: "Synchronization Design for D2D Broadcast Communication", 3GPP Draft, R1-140269, Sync Comm, 3rd Generation Partnership Project (3GPP), Mobile Competence Centre; 650, Route Des Lucioles; F-06921, Sophia-Antipolis Cedex; France, vol. RAN WG1, No. Prague, Czech Republic; (Feb. 10, 2014-Feb. 14, 2014), Feb. 9, 2014 (Feb. 9, 2014), XP050735819, 11 Pages, Retrieved from the Internet: URL:http://www.3gpp.org/ftp/Meetings_3GPP_SYNC/RAN/RAN1/Docs/ [retrieved on Feb. 9, 2014].

\* cited by examiner

TECHNIQUES FOR SIGNALING AND CHANNEL DESIGN IN NEW RADIO

CROSS-REFERENCE TO RELATED APPLICATION

This application claims the benefit of U.S. Provisional Application Ser. No. 62/417,036, entitled "CONSIDERATIONS ON CERTAIN ASPECTS IN NEW RADIO" and filed on Nov. 3, 2016, which is expressly incorporated by reference herein in its entirety.

BACKGROUND

Aspects of the present disclosure relate generally to wireless communications systems, and more particularly, to techniques for signaling and channel design in wireless communications systems (e.g., the 5th Generation (5G) New Radio (NR)).

Wireless communications systems are widely deployed to provide various telecommunication services such as telephony, video, data, messaging, and broadcasts. Typical wireless communications systems may employ multiple-access technologies capable of supporting communications with multiple users by sharing available system resources (e.g., time, frequency, power, and/or spectrum). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA).

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5G NR communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information.

In addition, 5G NR is part of a continuous mobile broadband evolution promulgated by the Third Generation Partnership Project (3GPP) to meet new requirements associated with latency, reliability, security, scalability (e.g., with Internet of Things (IoT)), and other requirements. Some aspects of 5G NR may be based on LTE standard. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for increased data rates, reduced latency, higher capacity, and better resource utilization, new approaches may be desirable to improve the signaling and channel design, spectral efficiency, and user experience in wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

According to an example, a method related to synchronization channel processing in wireless communications is provided. In an aspect, the method includes identifying a direct current (DC) subcarrier of a synchronization bandwidth, determining whether a synchronization signal transmits on, punctures, or rate matches around the DC subcarrier, and performing synchronization channel processing based on the determination.

According to another example, a method related to resource block (RB) design and signaling in wireless communications is provided. In an aspect, the method includes identifying a first subcarrier spacing used for a first RB, identifying at least a second subcarrier spacing and a guard band used for a second RB, wherein the second subcarrier spacing is less than the first subcarrier spacing, and generating the second RB using at least the second subcarrier spacing with the guard band.

In an aspect, a method related to DC and synchronization channel management in a wireless communications system is provided. The method includes signaling the presence or a location of a DC subcarrier, and transmitting synchronization information that is independent from the DC subcarrier.

In another aspect, a method related to synchronization channel processing in a wireless communications system is provided. The method includes identifying a synchronization signal or a broadcast channel, and transmitting, puncturing, or rate matching around a DC subcarrier based on the identified synchronization signal or broadcast channel.

In an aspect, a method related to multiple coding schemes for data transmission in a wireless communications system is provided. The method includes identifying an information block size, and determining one or more channel coding schemes for data transmission based on the identified information block size, wherein the one or more channel coding schemes include at least one of Polar code, low-density parity check (LDPC) code, or Turbo code.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium (e.g., a non-transitory computer-readable medium) is provided and includes code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
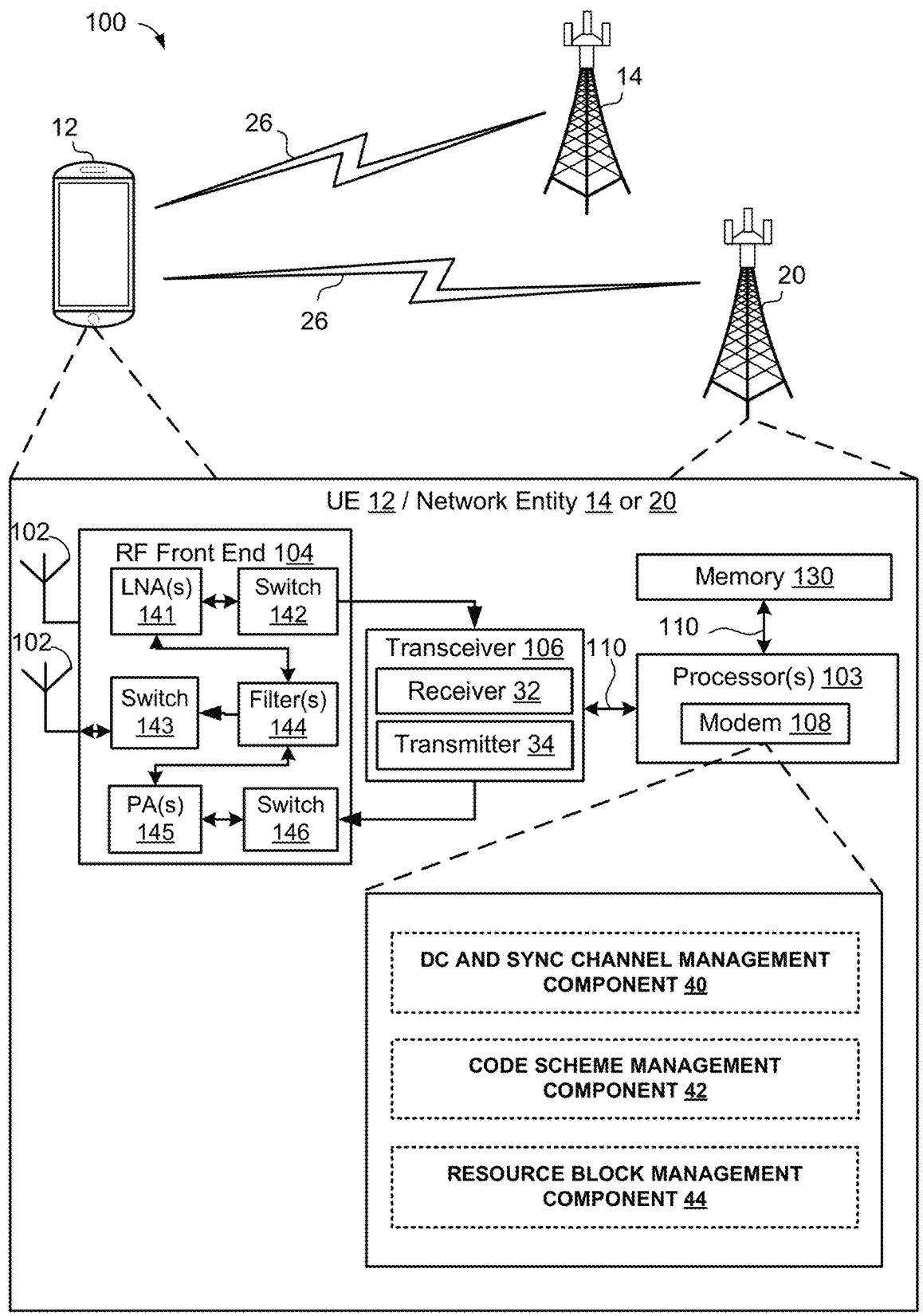
FIG. 1 is a block diagram of an exemplary communications network including at least one network entity in communication with a user equipment (UE) configured to operate or perform wireless communications management according to one or more of the presently described aspects.

In some wireless communication systems, for example, in an LTE or LTE-A system, Direct Current (DC) insertion may be used in downlink (DL). In some examples in an LTE system, DL system (SYS) bandwidth (BW) may be 20 MHz, and there are 1200 subcarriers without the DC subcarrier, and totally 1201 subcarriers including the DC subcarrier/component/tone within the 20 MHz BW. In some examples, DC insertion means the DC subcarriers/components/tones are inserted or included in transmissions (e.g., in resource blocks (RBs)) in addition to the 1200 subcarriers within the 20 MHz BW. In some implementations, no information may be carried in the DC subcarrier(s) corresponding to system bandwidth. In some aspects, the definition of resource block (RB) may not include the DC subcarrier.

In some examples, the receiver may be informed of the presence of the DC subcarrier and the location of the DC subcarrier in a main data path (e.g., by the network or a cell), however, the receiver may not be indicated or informed about this knowledge before the receiver acquires the cell (e.g., via the cell identification (ID)). In synchronization (SYNC) channel processing, for example, the receiver may filter the received signal based on SYNC BW and may effectively create a DC subcarrier of SYNC BW. In some cases, the number of subcarriers per physical resource block (PRB) is 12, with each subcarrier having a 120 KHz spacing. In fractional PRBs, the number of subcarriers may be less than the number of subcarriers in one RB, to achieve higher bandwidth efficiency compared to using RB granularity as guard-band. Using fractional PRBs or fractional RBs may increase signaling overhead or receiver complexity. For example, a demodulation reference signal (DMRS) pattern may be different in a fractional RB compared to the DMRS pattern in a regular RB. In another example, the number of DMRS subcarriers may be different from the DMRS subcarriers in a regular RB, which may add additional reference signal (RS) processing parameters. In some cases, one or more PRBs in frequency domain may be the minimum resource unit size for an uplink (UL) control channel. In some examples, with the current RB definition, a PRB (or multiple PRBs) may be the minimum resource unit size for an UL data channel. However, in some examples, the PRB granularity may not achieve the maximum power utilization considering power spectral density (PSD) limit per MHz, e.g., 1 MHz with 12 subcarriers/tones.

As such, new approaches of SYNC channel and RB design and signaling may be desirable to improve the system design, spectral efficiency, and user experience in wireless communications (e.g., 5G NR).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. In some aspects, the computer-readable media may be non-transitory or include a non-transitory computer-readable storage medium.

Described herein are various aspects related to a wireless communications system (e.g., 5G NR or simply NR). In 5G NR, there may be no explicit DC subcarrier reserved for DL and/or uplink (UL) transmissions (e.g., DL signal transmission and/or UL signal transmissions). In some aspects, handling of the DC subcarrier on the transmitter side may be specified. In some implementations, a receiver may be aware of where the DC subcarrier is, or is being informed (e.g., by specification or signaling) of where the DC subcarrier is, or if the DC subcarrier is not present within the receiver's bandwidth. In some aspects, when the receiver is informed that the DC subcarrier is present, the transmitter's DC subcarrier may be punctured, rate matched, modulated, or an error vector magnitude (EVM) is not specified. In some other aspects, when the DC subcarrier is not present, all subcarriers within the receiver bandwidth maybe transmitted.

In some aspects, handling of the DC subcarrier(s) on the receiver side may not be specified. In other words, no special handling of the DC subcarrier(s) on the receiver side is specified. In some implementations, for example, the receiver may puncture data received on the DC subcarrier(s).

In some aspects, when there is no DC insertion (e.g., 1200 subcarriers but no DC subcarrier as discussed above), a synchronization channel (e.g., a SYNC channel) may be impacted. In some examples, non-DC-centered SYNC channel is used in a plurality of wireless communications systems. In an example of an implementation of 5G NR, to minimize a user equipment (UE)'s initial search complexity, a SYNC channel raster may be used with much coarser granularity compared to the channel raster. For example, the SYNC channel may be with 1 MHz raster while the channel raster is with 100 KHz, which implies that, for example, the SYNC channel may not be always centered with respect to the DC tone/subcarrier of the system bandwidth.

In some examples with unlicensed or shared spectrum, the system bandwidth may be wider than the channel sensing granularity. For example, the system bandwidth (SYS BW) may be 80 MHz while the channel sensing is operated in every 20 MHz. In order for a UE to acquire the system or network when a node does not have the full 80 MHz channel availability, the SYNC channel may be transmitted on each 20 MHz, and therefore, the SYNC channel may not be centered with respect to the DC tone/subcarrier of the system bandwidth.

In some examples of a narrowband (NB) radio technology developed for the Internet-of-Things (IoT), NB-IoT, a fraction of DL bandwidth may be used to transmit NB-IoT signal(s). In some aspects, a NB-IoT SYNC channel may not be always centered with respect to the DC tone/subcarrier of the system bandwidth. In some examples, the DC subcarrier may or may not be present on the SYNC channel, according to one or more of the described aspects herein.

In some aspects, the receiver may be informed of the presence of the DC subcarrier and the location of the DC subcarrier in a main data path (e.g., by the network or a cell), however, the receiver may not be indicated or informed about this knowledge before the receiver acquires the cell (e.g., via the cell identification (ID)). In a current LTE system, for example, the SYS BW may be 20 MHz while the SYNC BW may be 1.08 MHz (6 RBs). In some examples, the transmission of the SYNC channel is independent from the transmission over the DC subcarrier of the SYS BW if the transmission falls into the SYNC BW. For example, a Primary Synchronization Signal (PSS), a Secondary Synchronization Signal (SSS), and/or a Physical Broadcast Channel (PBCH) may always transmit on the DC subcarrier of SYS BW if the transmission falls into the SYNC BW and does not collide with the DC subcarrier of SYNC BW.

In some examples, after the receiver acquires the cell ID, the presence and location of the DC subcarrier of SYS BW may be signaled on a PBCH, and the UE and/or the network (e.g., a gNB) may use the location of the DC subcarrier accordingly. In some aspects, the signaling may be explicit or implicit via the BW and/or a SYNC raster offset with respect to the center of the system BW or spectrum. For example, the presence and/or the location of the DC subcarrier of SYS BW may be signaled implicitly via a PSS, a SSS, or a PBCH, in order for the UE or the network for signal synchronization. In some examples, a PBCH may signal whether the spectrum is frequency-division duplexing (FDD) spectrum, time-division duplexing (TDD) spectrum, shared spectrum, or unlicensed spectrum. In some examples, a PBCH may indicate the cyclic prefix (CP) length for data channel. In some examples, a PBCH may indicate the subcarrier spacing used for data channel.

In some current implementations of SYNC channel processing, for example, the receiver may filter the received signal based on SYNC BW and may effectively create a DC subcarrier of SYNC BW. In a current LTE system, for example, the SYS BW may be 20 MHz while the SYNC BW may be 1.08 MHz (6 RBs). By using a down sampling filter (e.g., a narrow band filter), the receiver may receive a 1.08 MHz SYNC signal with 6 RBs instead of the 20 MHz signal, and may perform PSS/SSS detection(s) and/or PBCH demodulation using one or more smaller sampling rates. In other words, the SYNC channel may have smaller BW compared with the overall SYS BW. The smaller the SYNC BW is, the smaller sampling rate may be applied or needed. As a result, faster UE processing, less computation, and/or lower system complexity may be achieved because of the smaller SYNC BW.

In some examples, if a Zadoff-Chu (ZC) sequence is used for a PSS, the PSS may transmit or puncture the DC subcarrier of SYNC BW. In some examples, correlation property and/or Peak to Average Power Ratio (PAPR) may be maintained if the PSS transmits over or punctures the DC subcarrier of SYNC BW. In an example, when the PSS is transmitted on the DC subcarrier of SYNC BW, the receiver may choose to generate a PSS sequence for correlation by puncturing the symbol mapped to the DC subcarrier of SYNC BW. In another example, when the PSS is transmitted on the DC subcarrier of SYNC BW, the receiver may choose to generate the PSS sequence without puncturing.

In some examples, if a ZC sequence is not used for a PSS, the PSS may transmit, puncture, or rate match around the DC subcarrier (e.g., ignoring the DC subcarrier) of SYNC BW. In some examples, a SSS may transmit or rate match around the DC subcarrier of SYNC BW. In some examples, a PBCH may transmit, puncture, or rate match around the DC subcarrier of SYNC BW.

In some examples, there may be a one-tone/subcarrier loss if performing rate matching around the DC subcarrier or puncturing the DC subcarrier. In some examples, if a pseudo-noise (PN) sequence is used for a PSS, a SSS, or a PBCH, the PSS/SSS/PBCH may transmit, puncture, or rate match around the DC subcarrier of SYNC BW.

In some examples, the PSS and/or SSS may use less BW (e.g., does not occupy all of the 6 RBs) than PBCH, and there may be some BW margin (e.g., extra tones/subcarriers) for the PSS and/or SSS to rate match around the DC subcarrier of SYNC BW.

In some aspects, when there is no DC insertion, some DL channels may be impacted. In some current implementations, control and/or data channels may use Space Frequency Block Coding (SFBC). In some aspects, the DC subcarrier may fall into one of SFBC data subcarriers, which may affect the other data subcarrier(s). In some examples, small delay cyclic diversity (SCDD) may be used where the DC or DC insertion impact is self-contained on the DC subcarrier. In some examples, when SFBC is used, in an example, only one stream (e.g., single stream) on the non-DC subcarrier may be transmitted if the DC subcarrier falls into a SFBC pair. In another example when SFBC is used, the UE and/or the network may puncture or rate match around both the non-DC subcarrier and the DC subcarrier if the DC subcarrier falls into the SFBC pair.

In some examples, a same or similar mechanism as described herein may be applied to both DL and UL transmissions, for example, when Code Division Multiplexing (CDM) is used in frequency. In one aspect, when the DC subcarrier falls into a CDM cluster, either reduced multiplexing capability may be applied or the entire CDM cluster may not be used for transmission.

In some current implementations, for example, in LTE systems, no DC insertion is used in UL transmission. Instead, in some examples, a half tone shift is used. For example, if a subcarrier has 15 KHz spacing, with half tone shift, the DC subcarrier may be at 7.5 KHz instead of 0 KHz.

In some examples in 5G NR systems, a half-tone shift may not be used in UL transmission. In some aspects, DL transmission in a 5G NR system may not use half-tone shift, and to unify and compatible with the DL transmission, UL transmission may also not use half-tone shift. In addition, in some examples, half-tone shift may bring additional interference(s) for UL and/or DL transmission(s).

In some examples, single-carrier frequency-division multiplexing (SC-FDM) may be used for UL single-stream transmission(s) while orthogonal frequency division multiplexing (OFDM) waveform(s) may be used for both single-stream and multi-stream transmission(s). In some examples, the impact of the DC subcarrier may be different depending on UL waveform(s).

In some examples, a UE may have different handling on the DC subcarrier depending on the usage of SC-FDM or OFDM transmission in UL. For example, for SC-FDM UL transmission, ZC sequence(s) may be used. In some examples, SC-FDM UL transmission may include UL demodulation reference signal(s) (DMRS), sounding reference signal(s) (SRS), and/or UL data transmission. In this case, UE may puncture the DC subcarrier, or transmit on the DC subcarrier without any special handling. On the other hand, for OFDM UL transmission, in some examples, the UE may transmit on the DC subcarrier without special handling, puncture or rate match around the DC subcarrier for UL data, or puncture or rate match around for UL DMRS. In some examples, for UL multi-user multiple-input and multiple-output (MU-MIMO) transmission, the UL DMRS handling on the DC subcarrier may be aligned across multiple UEs. In some examples, the network (e.g., a base station or a gNB) may signal the UE on how to deal with the DC subcarrier for UL transmission.

In some current implementations, for example, in LTE systems, turbo code is used as a coding scheme for DL and/or UL data transmission.

In some examples in 5G NR systems, one or more coding schemes for data transmission may be applied or used. In some examples, low-density parity check code (LDPC) may be used for both DL and UL transmission for reduced complexity, fast turnaround time, and/or reduced delay. In some examples, the channel coding scheme for enhanced mobile broadband (eMBB) data is LDPC, at least for information block size is larger than a predetermined threshold (e.g., information block size >X, where X may be a value from 128 bits to 1024 bits). In some examples, at least one of Polar, LDPC, or Turbo is supported for information block size of eMBB data equal or less than a predetermined threshold (e.g., information block size ≤X, where X may be a value from 128 bits to 1024 bits). In some examples, taking complexity into account, the predetermined value is within a certain range (e.g., 128 bits≤X≤1024 bits). In some examples, in addition to LDPC, at least one of Polar, LDPC, or Turbo code is used as a second coding scheme for data transmission.

In some examples in 5G NR systems, different coding schemes are used for information block size being larger than a predetermined threshold (e.g., information block size >X, where X may be a value from 128 bits to 1024 bits) and information block size being equal or less than a predetermined threshold (e.g., information block size ≤X, where X may be a value from 128 bits to 1024 bits).

In some examples in 5G NR systems using single-user multiple-input and multiple-output (SU-MIMO) transmission, multiple codeword (MCW) may be used, (e.g., similarly as in an LTE system using multiple MCW). In some aspects, compared to single codeword (SCW), MCW may allow different link adaptation on different layer(s), which may be beneficial when different layer(s) experience different signal-to-noise ratio(s) (SNR). In some aspects, with MCW, the transport block size (TBS) for one codeword is larger than a predetermined threshold (e.g., TBS>X) while the TBS for another codeword is equal or less than a predetermined threshold (e.g., TBS≤X). In some examples in millimeter wave (mmW), two codewords (CWs) and/or transport blocks (TBs) may be transmitted from different transmission points (TPs), which may lead to one TBS being larger than a predetermined threshold (e.g., TBS>X) while the other TBS being equal or less than a predetermined threshold (e.g., TBS≤X).

In some examples in 5G NR systems, with multi-user multiple-input and multiple-output (MU-MIMO) or superposition coding, on both DL and UL transmission(s), a UE may be scheduled with a TBS being larger than a predetermined threshold (e.g., TBS>X) while the other UE may have a TBS being equal or less than a predetermined threshold (e.g., TBS≤X).

In some implementations, for a same transmission time interval (TTI), different coding scheme on a different codeword may introduce additional UE complexity, for example, on a network-assisted interference cancelation (NAIC) receiver.

In some examples, with multi-layer transmission, when one codeword has TBS>X while the other one has TBS≤X, the same coding scheme may be used for both codewords. For example, the same coding scheme may be aligned with the one with TBS>X or the one TBS≤X. In some aspects, multiple layer transmission may be for a single UE (e.g., SU-MIMO transmission), or for multiple UEs (e.g., MU-MIMO transmission), or from different TRPs, or the layer spatial signature being the same (e.g., superposition coding).

In some examples, when one codeword succeeds in one or more earlier transmissions, an outstanding codeword may use the same coding scheme as in a first transmission or the one or more earlier transmissions to enable hybrid automatic repeat request (HARQ) combining. For example, when a new codeword is transmitted on terminated layers, the new codeword may follow the same coding scheme as the outstanding codeword. In some examples, transmitting a new codeword may be considered as a first transmission. In some examples, the above discussed scheme may be achieved by imposing the TBS constraint on the new codeword. In some other examples, mapping between the TBS and the coding scheme may be only applicable when all the TBs are with the initial transmission while the coding scheme for retransmission dictates the coding scheme for all new transmissions.

In some current implementations, the number of subcarriers per physical resource block (PRB) is 12, with each subcarrier having a 120 KHz spacing. In some implementations on fractional PRBs, the number of subcarriers may be less than the number of subcarriers in one RB, to achieve higher bandwidth efficiency compared to using RB granularity as guard-band. In some implementations, using fractional PRBs or fractional RBs may increase signaling overhead or receiver complexity. For example, a DMRS pattern may be different in a fractional RB compared to the DMRS pattern in a regular RB. In another example, the number of DMRS subcarriers may be different from the DMRS subcarriers in a regular RB, which may add additional RS processing parameters.

In some examples, the network and/or the UE may stay with the current PRB definition (e.g., each PRB has 12 subcarriers). In some aspects, the network and/or the UE may use mixed numerology to achieve higher bandwidth efficiency. For example, with 120 KHz subcarrier spacing, if a guard band consists of 480 KHz, instead of using a fractional RB with 4 subcarriers, the network and/or the UE may use 30 KHz numerology with one RB and leave 120 KHz as the guard band between the regular 120 KHz subcarrier(s) and the 30 KHz numerology.

In some current implementations, as discussed above, the number of subcarriers per PRB is 12, with each subcarrier having a 120 KHz spacing. In frequency domain, a PRB (or multiple PRBs) may be the minimum resource unit size for an UL control channel. In some examples, with the current RB definition, a PRB (or multiple PRBs) may be the minimum resource unit size for an UL data channel. However, in some examples, the PRB granularity may not achieve the maximum power utilization considering power spectral density (PSD) limit per MHz, e.g., 1 MHz with 12 subcarriers/tones.

In some examples, mini-RB may be used for shared spectrum where a RB is further divided into multiple mini-RB for resource allocation. In some current implementations, there are 14 symbols in a subframe with two slots, wherein each slot has 7 symbols. In some examples, a RB may be equal to one slot long in time with 7 symbols. In an example, a mini-RB may include 4 subcarriers, less than a regular RB which includes 12 subcarriers. In some examples, a RB may include one or more mini-RBs for transmissions in order to achieve better spectrum and/or power utilization.

In some examples, the network and/or the UE may use interlace with regular or irregular RB spacing to maximum power utilization. In an aspect, for interlacing with regular RB spacing, an interlace may consist of multiple RBs that are uniformly spaced, for example, RB0, RB10, RB20, RB90 may consist of one interlace in license assisted access (LAA). In another aspect, for interlacing with irregular RB spacing, multiple RBs within an interlace may not be uniformly spaced, for example, RB0, RB8, RB19, RB31, RB95 may consist of one interlace. In some cases, the number of RBs, subcarriers, or mini-RBs may have equal spacings where the spacing is uniform. In an example, the spacing may be in terms of the number of subcarriers or number of RBs. The example discussed herein is in terms of RBs, and the interlacing may also be used in terms of mini-RBs or subcarriers.

Each of the aspects described above are performed or implemented in connection with FIGS. 1-7, which are described in more detail below.

Referring to FIG. 1, in an aspect, a wireless communication system 100 includes at least one UE 12 in communication coverage of at least one network entity 14 or network entity 20 (e.g., base station or gNB, or a cell thereof, in a 5G NR network). UE 12 may communicate with a network via the network entity 14 or network entity 20. In some aspects, multiple UEs including UE 12 may be in communication coverage with one or more network entities, including network entity 14 and network entity 20. In an aspect, the network entity 14 or network entity 20 may be a base station such a gNB in a 5G NR network. Although various aspects are described in relation to a UMTS, LTE, or 5G NR networks, similar principles may be applied in other wireless wide area networks (WWAN). The wireless network may employ a scheme where multiple base stations may transmit on a channel. In an example, UE 12 may transmit and/or receive wireless communications to and/or from network entity 14 and/or network entity 20. For example, the UE 12 may be actively communicating with network entity 14 and/or network entity 20.

In some aspects, UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things (IoT), or any other similar functioning device. Additionally, network entity 14 or network entity 20 may be a macrocell, picocell, femtocell, relay, Node B, mobile Node B, eNB, gNB, smallcell box, UE (e.g., communicating in peer-to-peer or ad-hoc mode with UE 12), or substantially any type of component that can communicate with UE 12 to provide wireless network access at the UE 12.

According to the present aspects, the UE 12 and/or network entity 14/20 may include one or more processors 103 and a memory 130 that may operate in combination with a DC and SYNC channel management component 40 for DC and SYNC channel management, a code scheme management component 42 for code scheme design and management, and/or a resource block management component 44 for RB design, signaling and management as described herein. In an aspect, the term "component" as used herein may be one of the parts that make up a system, may be hardware, firmware, and/or software, and may be divided into other components. The DC and SYNC channel management component 40, code scheme management component 42, and/or resource block management component 44 may be communicatively coupled to a transceiver 106, which may include a receiver 32 for receiving and processing RF signals and a transmitter 34 for processing and transmitting RF signals. The processor 103 may be coupled to the transceiver 106 and memory 130 via at least one bus 110.

The receiver 32 may include hardware, firmware, and/or software code executable by a processor for receiving data, the code comprising instructions and being stored in a memory (e.g., computer-readable medium). The receiver 32 may be, for example, a radio frequency (RF) receiver. In an aspect, the receiver 32 may receive signals transmitted by UE 12 or network entity 14/20. The receiver 32 may obtain measurements of the signals. For example, the receiver 32 may determine Ec/Io, SNR, etc.

The transmitter 34 may include hardware, firmware, and/or software code executable by a processor for transmitting data, the code comprising instructions and being stored in a memory (e.g., computer-readable medium). The transmitter 34 may be, for example, a RF transmitter.

In an aspect, the one or more processors 103 can include a modem 108 that uses one or more modem processors. The various functions related to the DC and SYNC channel management component 40, the code scheme management component 42, and/or the resource block management component 44 may be included in modem 108 and/or processors 103 and, in an aspect, can be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in the DC and SYNC channel management component 40, the code scheme management component 42, and/or the resource block management component 44.

The DC and SYNC channel management component 40, code scheme management component 42, and/or the resource block management component 44 may include hardware, firmware, and/or software code executable by a processor for performing ciphering/deciphering management and operations. For example, the hardware may include, for example, a hardware accelerator, or specialized processor.

Moreover, in an aspect, UE 12 and/or network entity 14/20 may include RF front end 104 and transceiver 106 for receiving and transmitting radio transmissions, for example, wireless communications 26. For example, transceiver 106 may transmit or receive one or more signals (e.g., PSS, SSS, PBCH, PRACH, PDCCH, or PDSCH). The transceiver 106 may measure a received pilot signal in order to determine signal quality and for providing feedback to the network entity 14. For example, transceiver 106 may communicate with modem 108 to transmit messages generated by DC and SYNC channel management component 40, code scheme management component 42, and/or resource block management component 44 and to receive messages and forward them to DC and SYNC channel management component 40, code scheme management component 42, and/or resource block management component 44.

RF front end 104 may be connected to one or more antennas 102 and can include one or more low-noise amplifiers (LNAs) 141, one or more switches 142, 143, one or more power amplifiers (PAs) 145, and one or more filters 144 for transmitting and receiving RF signals. In an aspect, components of RF front end 104 can connect with transceiver 106. Transceiver 106 may connect to one or more modems 108 and processor 103.

In an aspect, LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the DC and SYNC channel management component 40, the code scheme management component 42, and/or the resource block management component 44.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 can be used by RF front end 104 to filter a received signal to obtain an input RF signal. Similarly, in an aspect, for example, a respective filter 144 can be used to filter an output from a respective PA 145 to produce an output signal for transmission. In an aspect, each filter 144 can be connected to a specific LNA 141 and/or PA 145. In an aspect, RF front end 104 can use one or more switches 142, 143, 146 to select a transmit or receive path using a specified filter 144, LNA, 141, and/or PA 145, based on a configuration as specified by transceiver 106 and/or processor 103.

Transceiver 106 may be configured to transmit and receive wireless signals through antenna 102 via RF front end 104. In an aspect, transceiver may be tuned to operate at specified frequencies such that UE 12 can communicate with, for example, network entity 14 or network entity 20. In an aspect, for example, modem 108 can configure transceiver 106 to operate at a specified frequency and power level based on the UE configuration of the UE 12 and communication protocol used by modem 108.

In an aspect, modem 108 can be a multiband-multimode modem, which can process digital data and communicate with transceiver 106 such that the digital data is sent and received using transceiver 106. In an aspect, modem 108 can be multiband and be configured to support multiple frequency bands for a specific communications protocol. In an aspect, modem 108 can be multimode and be configured to support multiple operating networks and communications protocols. In an aspect, modem 108 can control one or more components of UE 12 or network entity 14/20 (e.g., RF front end 104, transceiver 106) to enable transmission and/or reception of signals based on a specified modem configuration. In an aspect, the modem configuration can be based on the mode of the modem and the frequency band in use. In another aspect, the modem configuration can be based on UE configuration information associated with UE 12 as provided by the network during cell selection and/or cell reselection.

UE 12, network entity 14, or network entity 20 may further include memory 130, such as for storing data used herein and/or local versions of applications or DC and SYNC channel management component 40, code scheme management component 42, and/or resource block management component 44 being executed by processor 103. Memory 130 can include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, memory 130 may be a computer-readable storage medium that stores one or more computer-executable codes defining DC and SYNC channel management component 40, code scheme management component 42, and/or resource block management component 44, and/or data associated therewith, when UE 12 and/or network entity 14/20 is operating processor 103 to execute DC and SYNC channel management component 40, code scheme management component 42, and/or resource block management component 44. In another aspect, for example, memory 130 may be a non-transitory computer-readable storage medium.

Figure 2:
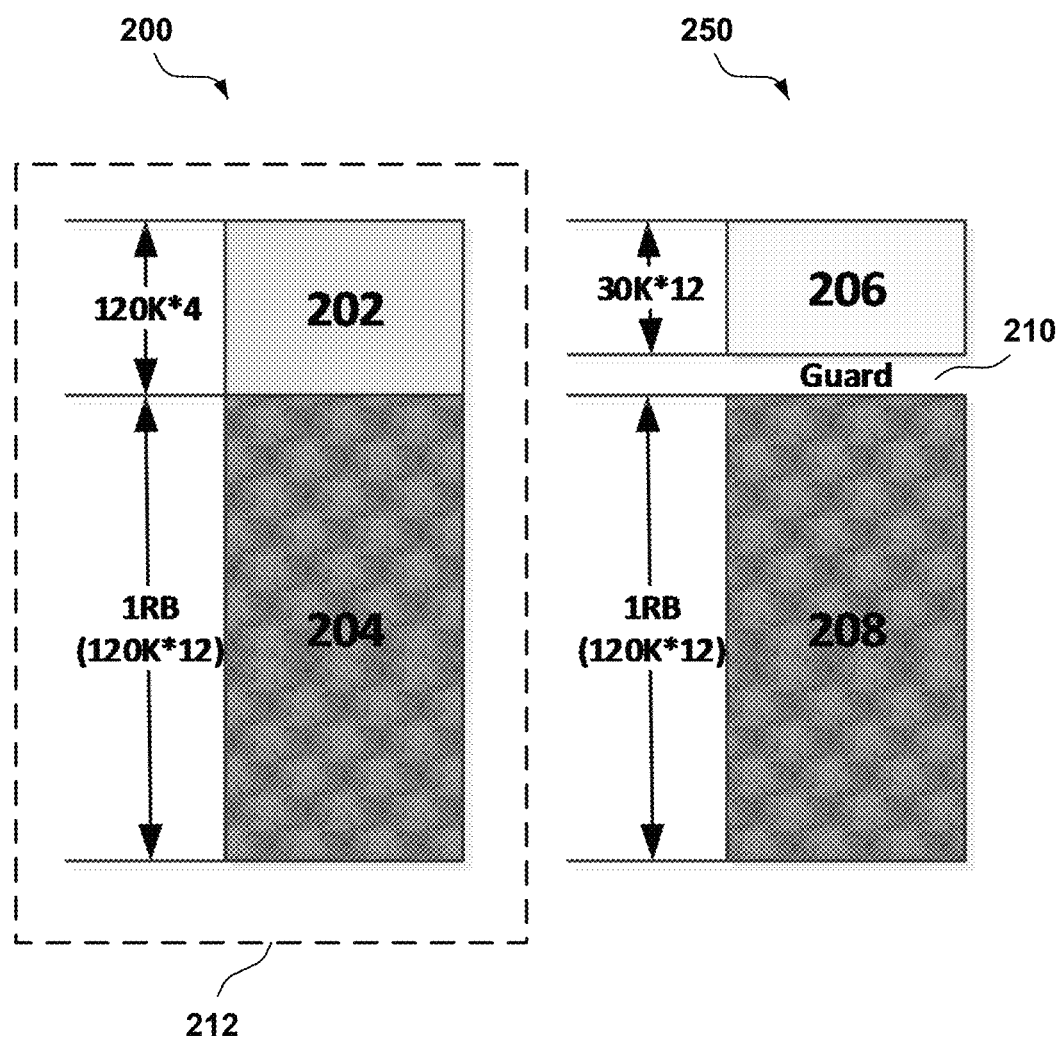
FIG. 2 includes two block diagrams of two exemplary resource block (RB) design schemes, according to one or more of the presently described aspects.

Referring to FIG. 2, two example resource block (RB) schemes 200 and 250 are shown for comparison of a fractional RB (block 202) and mixed numerology (block 206) with a regular RB (block 204, or block 208). In an aspect, in RB scheme 200, one or more fractional RBs (e.g., block 202) with four 120 KHz subcarriers may be used. In another aspect, in RB scheme 250, mixed numerology with regular RB definition may be used. For example, with 120 KHz subcarrier spacing, if the guard band consists of 480 KHz, instead of using fractional RB 202 with four subcarriers, the system or the UE may use 30 KHz numerology with RB 206 and leave 120 KHz as a guard band (e.g., guard 210) between the regular 120 KHz subcarriers in block 208 and the 30 KHz numerology subcarriers in block 206.

In some examples, an extended RB may be used, which include more than 12 subcarriers. For example, an extended RB (block 212) may include 16 subcarriers or tones, which is more than a regular RB (block 204, or block 208) with 12 subcarriers or tones. In this case, each subcarrier in the extended RB (block 212) may have a 120 KHz bandwidth. In some cases, an extended RB may include 13 to 23 subcarriers, which may depend on system configuration or respective channel design.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Figure 3:
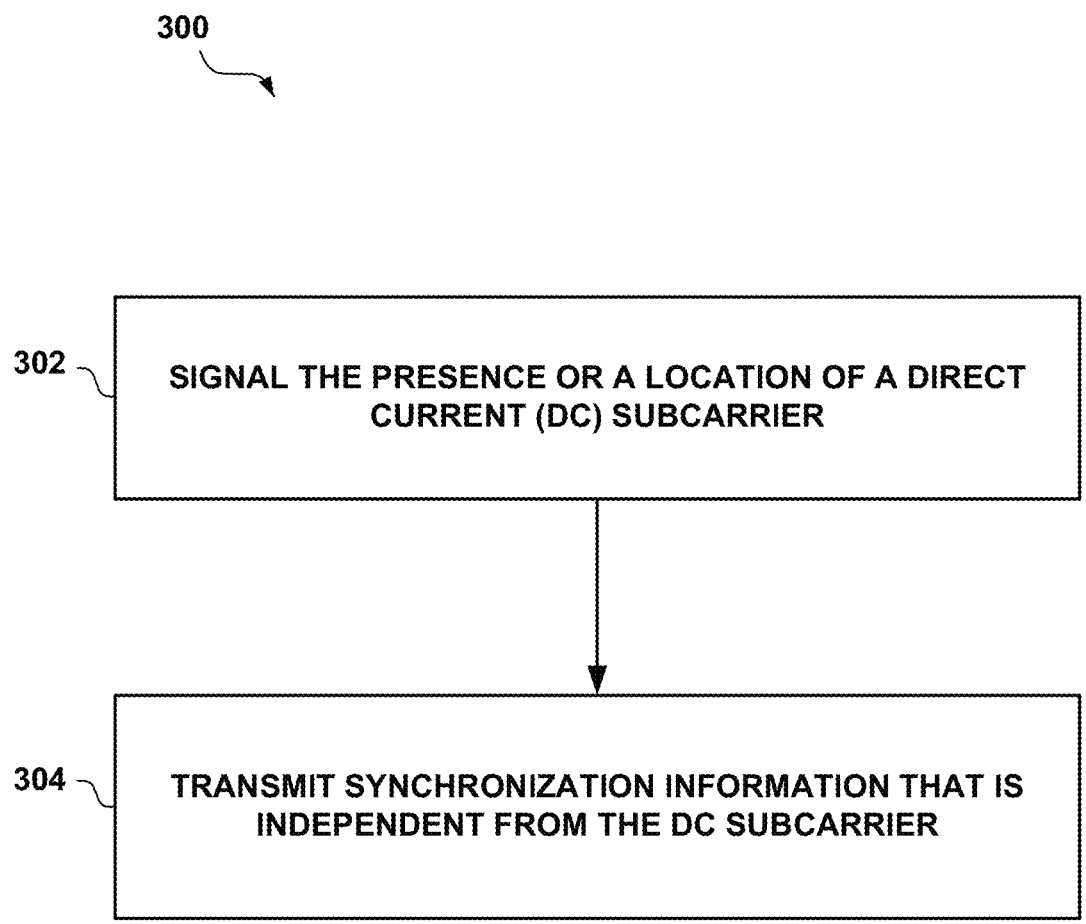
FIG. 3 is a flow chart of an exemplary method of direct current (DC) and synchronization channel management in wireless communications, according to one or more of the presently described aspects.

Referring to FIG. 3, in an operational aspect, a UE such as UE 12 (FIG. 1) and/or a network entity such as the network entity 14 or the network entity 20 (FIG. 1) may perform one or more aspects of a method 300 for direct current (DC) and/or synchronization channel management. For example, one or more of the processors 103, the memory 130, the modem 108, and/or the DC and SYNC channel management component 40, may be configured to perform one or more aspects of the method 300.

In an aspect, at block 302, the method 300 may include signaling the presence or a location of a direct current (DC) subcarrier. In an aspect, for example, along with one or more of the processors 103, the memory 130, the modem 108, and/or the transceiver 106, the DC and SYNC channel management component 40 (FIG. 1) may be configured to transmit or signal the presence or a location of a direct current (DC) subcarrier.

In another aspect, at block 304, the method 300 may include transmitting synchronization information that is independent from the DC subcarrier. In an aspect, for example, along with one or more of the processors 103, the memory 130, the modem 108, and/or the transceiver 106, the DC and SYNC channel management component 40 (FIG. 1) may be configured to transmit synchronization information that is independent from the DC subcarrier.

Figure 4:
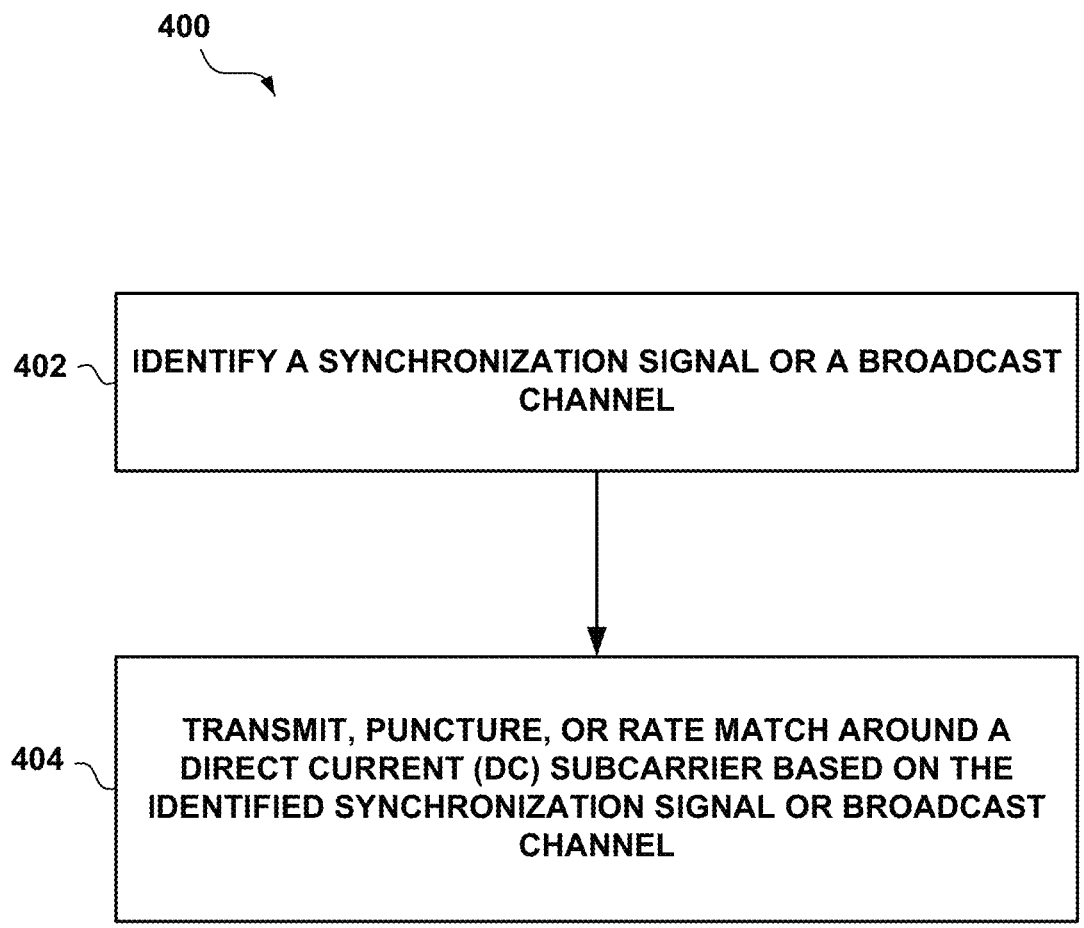
FIG. 4 is a flow chart of a first exemplary method of synchronization channel processing in wireless communications, according to one or more of the presently described aspects.

Referring to FIG. 4, in an operational aspect, a UE such as UE 12 (FIG. 1) and/or a network entity such as the network entity 14 or the network entity 20 (FIG. 1) may perform one or more aspects of a method 400 for synchronization channel processing. For example, one or more of the processors 103, the memory 130, the modem 108, and/or the DC and SYNC channel management component 40, may be configured to perform aspects of the method 400.

In an aspect, at block 402, the method 400 may include identifying a synchronization signal or a broadcast channel. In an aspect, for example, along with one or more of the processors 103, the memory 130, the modem 108, and/or the transceiver 106, the DC and SYNC channel management component 40 (FIG. 1) may be configured to identify a synchronization signal or a broadcast channel.

In another aspect, at block 404, the method 400 may include transmitting, puncturing, or rate matching around a direct current (DC) subcarrier based on the identified synchronization signal or broadcast channel. In an aspect, for example, along with one or more of the processors 103, the memory 130, the modem 108, and/or the transceiver 106, the DC and SYNC channel management component 40 (FIG. 1) may be configured to transmit, puncture, or rate match around the DC subcarrier based on the identified synchronization signal or broadcast channel at block 402.

Figure 5:
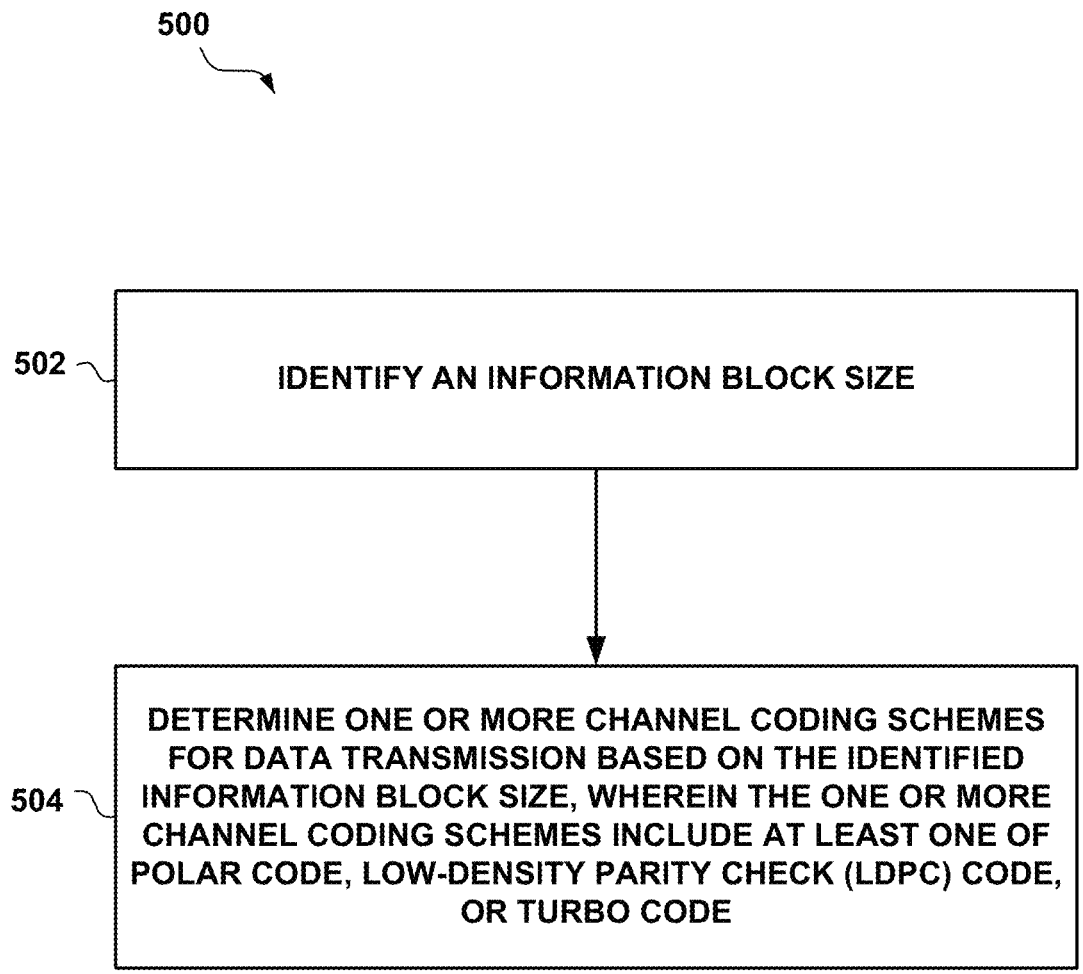
FIG. 5 is a flow chart of an exemplary method of coding schemes used for data transmission in wireless communications, according to one or more of the presently described aspects.

Referring to FIG. 5, in an operational aspect, a UE such as UE 12 (FIG. 1) and/or a network entity such as the network entity 14 or the network entity 20 (FIG. 1) may perform one or more aspects of a method 500 for selecting/managing coding schemes used for data transmission in a wireless communications system. For example, one or more of the processors 103, the memory 130, the modem 108, the code scheme management component 42, and/or the resource block management component 44, may be configured to perform aspects of the method 500. In some examples, in addition to LDPC, the code scheme management component 42 may be configured to select at least one of Polar, LDPC, or Turbo code to be used as a second coding scheme for data transmission.

In an aspect, at block 502, the method 500 may include identifying an information block size. In an aspect, for example, along with one or more of the processors 103, the memory 130, the modem 108, and/or the transceiver 106, the code scheme management component 42, and/or the resource block management component 44 (FIG. 1) may be configured to identify an information block size.

In another aspect, at block 504, the method 500 may include determining one or more channel coding schemes for data transmission based on the identified information block size, wherein the one or more channel coding schemes include at least one of Polar code, low-density parity check (LDPC) code, or Turbo code. In an aspect, for example, along with one or more of the processors 103, the memory 130, the modem 108, and/or the transceiver 106, the code scheme management component 42, and/or the resource block management component 44 (FIG. 1) may be configured to determine one or more channel coding schemes for data transmission based on the identified information block size at block 502. In some examples, the one or more channel coding schemes may include at least one of Polar code, LDPC code, or Turbo code.

Figure 6:
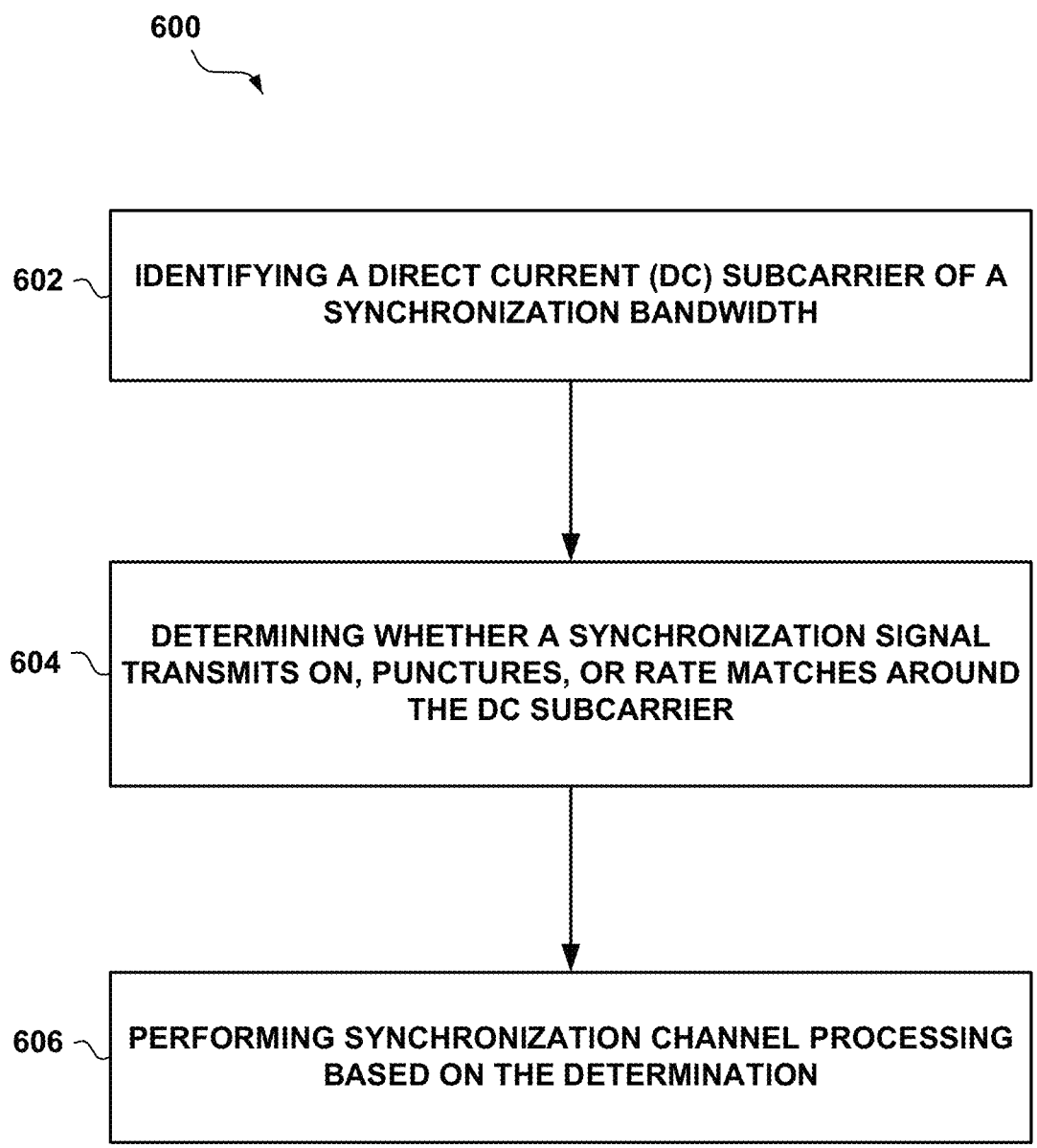
FIG. 6 is a flow chart of a second exemplary method of synchronization channel processing in wireless communications, according to one or more of the presently described aspects.

Referring to FIG. 6, in an operational aspect, a UE such as UE 12 (FIG. 1) may perform one or more aspects of a method 600 for synchronization channel processing. For example, one or more of the processors 103, the memory 130, the modem 108, and/or the DC and SYNC channel management component 40, may be configured to perform aspects of the method 600.

In an aspect, at block 602, the method 600 may include identifying a DC subcarrier of a synchronization bandwidth. In an aspect, for example, along with one or more of the processors 103, the memory 130, the modem 108, and/or the transceiver 106, the DC and SYNC channel management component 40 may be configured to identify a DC subcarrier within the synchronization bandwidth.

In an aspect, at block 604, the method 600 may include determining whether a synchronization signal transmits on, punctures, or rate matches around the DC subcarrier. In an aspect, for example, along with one or more of the processors 103, the memory 130, the modem 108, and/or the transceiver 106, the DC and SYNC channel management component 40 may be configured to determine whether a synchronization signal transmits on, punctures, or rate matches around the DC subcarrier.

In an aspect, at block 606, the method 600 may include performing synchronization channel processing based on the determination. In an aspect, for example, along with one or more of the processors 103, the memory 130, the modem 108, and/or the transceiver 106, the DC and SYNC channel management component 40 may be configured to perform synchronization channel processing based on the determination made at block 604.

In another aspect, the method 600 may include receiving an indication of the presence or a location of the DC subcarrier, and receiving the synchronization signal that is independent from the DC subcarrier, in response to a determination that the synchronization signal transmits on the DC subcarrier.

In an aspect, the method 600 may include determining that the synchronization signal transmits on or punctures the DC subcarrier in response to a determination that one or more ZC sequences are used for the synchronization signal.

In another aspect, the method 600 may include generating at least a synchronization sequence for correlation by puncturing a symbol mapped to the DC subcarrier.

In an aspect, the method 600 may include generating at least a synchronization sequence without puncturing a symbol mapped to the DC subcarrier.

In another aspect, the method 600 may include determining that the synchronization signal transmits on or rate matches around the DC subcarrier in response to a determination that one or more ZC sequences are not used for the synchronization signal.

In an aspect, the synchronization signal used in the method 600 may be a PSS, SSS, or a signal transmitted on a PBCH.

Figure 7:
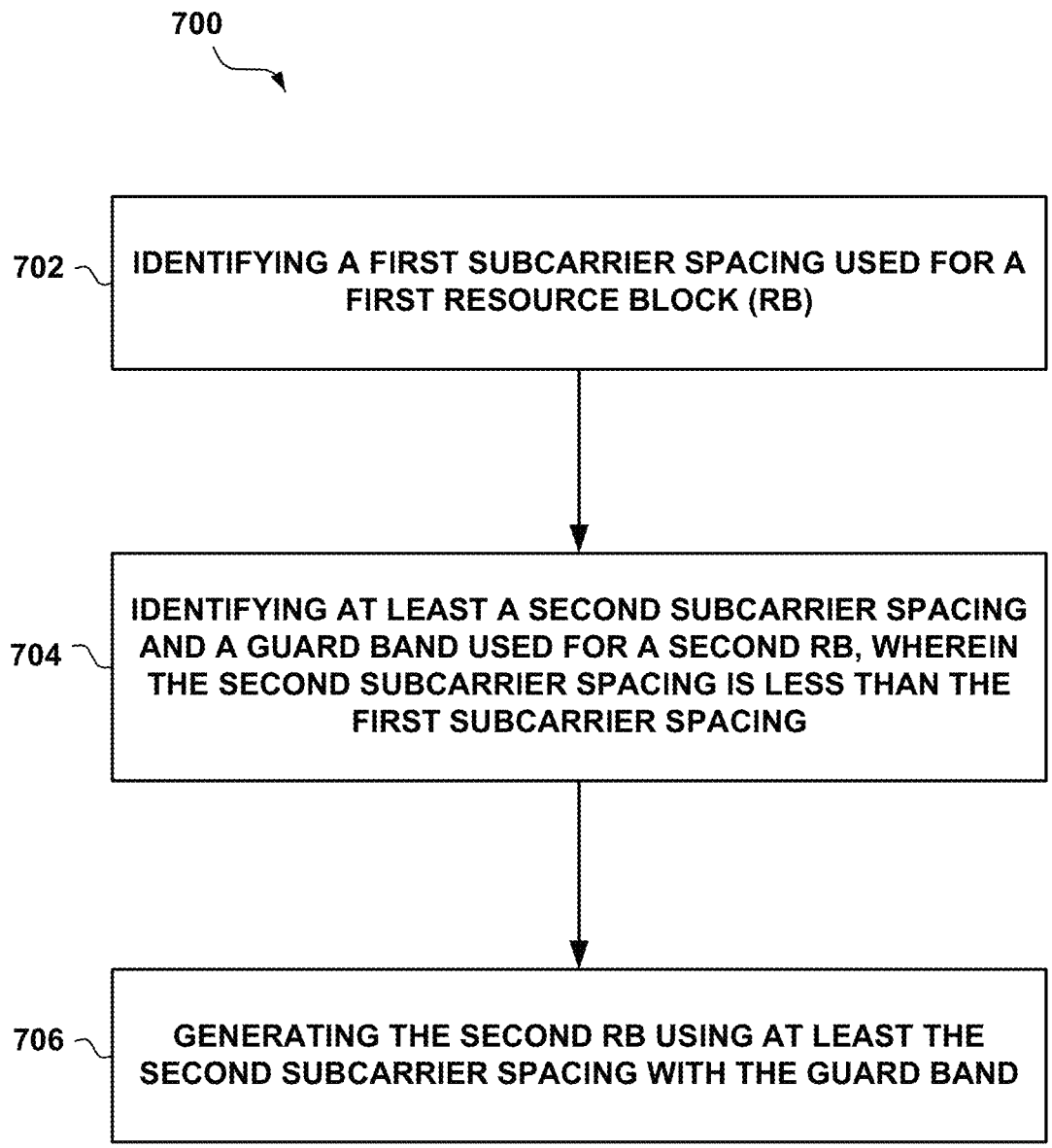
FIG. 7 is a flow chart of an exemplary method of RB design and signaling in wireless communications, according to one or more of the presently described aspects.

Referring to FIG. 7, in an operational aspect, a UE such as UE 12 (FIG. 1) may perform one or more aspects of a method 700 for RB design and signaling. For example, one or more of the processors 103, the memory 130, the modem 108, and/or the resource block management component 44, may be configured to perform aspects of the method 700.

In an aspect, at block 702, the method 700 may include identifying a first subcarrier spacing used for a first RB. In an aspect, for example, along with one or more of the processors 103, the memory 130, the modem 108, and/or the transceiver 106, resource block management component 44 may be configured to identify a first subcarrier spacing used for a first RB. In some examples, the first RB is a regular RB with 12 subcarriers, and each subcarrier has 120 KHz subcarrier or channel spacing.

In an aspect, at block 704, the method 700 may include identifying at least a second subcarrier spacing and a guard band used for a second RB, wherein the second subcarrier spacing is less than the first subcarrier spacing. In an aspect, for example, along with one or more of the processors 103, the memory 130, the modem 108, and/or the transceiver 106, the resource block management component 44 may be configured to identify at least a second subcarrier spacing and a guard band used for a second RB, and the second subcarrier spacing may be equal or less than the first subcarrier spacing.

In an aspect, at block 706, the method 700 may include generating the second RB using at least the second subcarrier spacing with the guard band. In an aspect, for example, along with one or more of the processors 103, the memory 130, the modem 108, and/or the transceiver 106, the resource block management component 44 may be configured to generate the second RB using at least the second subcarrier spacing with the guard band.

In an aspect of the method 700, the first RB has the same number of subcarriers as the second RB.

In another aspect, the method 700 may include generating at least a third RB using the first subcarrier spacing or the second subcarrier spacing, and the third RB comprises a different number of subcarriers compared to a number of subcarrier spacings in each of the first RB and the second RB.

In an aspect, the method 700 may include generating at least a third RB using the first subcarrier spacing and the second subcarrier spacing.

In another aspect of the method 700, the first RB or the second RB comprises 12 subcarriers.

Several aspects of a telecommunications system have been presented with reference to an LTE/LTE-A or a 5G NR communications system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Moreover, nothing disclosed herein is intended to be dedicated to the public regardless of whether such disclosure is explicitly recited in the claims.

What is claimed is:

1. A method for wireless communications, comprising:
   identifying a direct current (DC) subcarrier of a synchronization bandwidth;
   determining whether a synchronization signal transmits on, punctures, or rate matches around the DC subcarrier; and
   performing synchronization channel processing based on the determination of whether the synchronization signal is transmitted on, punctured, or rate matched around the DC subcarrier,
   wherein the determination that the synchronization signal transmits on or punctures the DC subcarrier is in response to a determination that one or more Zadoff-Chu (ZC) sequences are used for the synchronization signal.

2. The method of claim 1, further comprising:
   receiving an indication of a presence or a location of the DC subcarrier prior to acquisition of a cell; and
   receiving the synchronization signal that is independent from the DC subcarrier, in response to the determination that the synchronization signal transmits on the DC subcarrier.

3. The method of claim 1, further comprising:
   generating at least a synchronization sequence for correlation by puncturing a symbol mapped to the DC subcarrier.

4. The method of claim 1, further comprising:
   generating at least a synchronization sequence without puncturing a symbol mapped to the DC subcarrier.

5. The method of claim 1,
   wherein the determination that the synchronization signal transmits on or rate matches around the DC subcarrier is in response to a determination that one or more Zadoff-Chu (ZC) sequences are not used for the synchronization signal.

6. The method of claim 1, wherein the synchronization signal is a Primary Synchronization Signal (PSS), a Secondary Synchronization Signal (SSS), or a signal transmitted on a Physical Broadcast Channel (PBCH).

7. An apparatus for wireless communications, comprising:
   a receiver;
   a memory configured to store instructions; and
   at least one processor communicatively coupled with the receiver and the memory, wherein the at least one processor is configured to execute the instructions to:
      identify a direct current (DC) subcarrier of a synchronization bandwidth;
      determine whether a synchronization signal transmits on, punctures, or rate matches around the DC subcarrier; and
      perform synchronization channel processing based on the determination of whether the synchronization signal is transmitted on, punctured, or rate matched around the DC subcarrier,
   wherein the determination that the synchronization signal transmits on or punctures the DC subcarrier is in response to a determination that one or more Zadoff-Chu (ZC) sequences are used for the synchronization signal.

8. The apparatus of claim 7, wherein the at least one processor is further configured to execute instructions to:
   receive, via the receiver, an indication of a presence or a location of the DC subcarrier prior to acquisition of a cell; and
   receive, via the receiver, the synchronization signal that is independent from the DC subcarrier, in response to the determination that the synchronization signal transmits on the DC subcarrier.

9. The apparatus of claim 7, wherein the at least one processor is further configured to execute instructions to generate at least a synchronization sequence for correlation by puncturing a symbol mapped to the DC subcarrier.

10. The apparatus of claim 7, wherein the at least one processor is further configured to execute instructions to generate at least a synchronization sequence without puncturing a symbol mapped to the DC subcarrier.

11. The apparatus of claim 7, wherein the determination that the synchronization signal transmits on or rate matches around the DC subcarrier is in response to a determination that one or more Zadoff-Chu (ZC) sequences are not used for the synchronization signal.

12. The apparatus of claim 7, wherein the synchronization signal is a Primary Synchronization Signal (PSS), a Secondary Synchronization Signal (SSS), or a signal transmitted on a Physical Broadcast Channel (PBCH).

13. A non-transitory computer-readable medium storing computer-executable code that when executed by a processor cause the processor to:
    identify a direct current (DC) subcarrier of a synchronization bandwidth;
    determine whether a synchronization signal transmits on, punctures, or rate matches around the DC subcarrier; and
    perform synchronization channel processing based on the determination of whether the synchronization signal is transmitted on, punctured, or rate matched around the DC subcarrier,
    wherein the determination that the synchronization signal transmits on or punctures the DC subcarrier is in response to a determination that one or more Zadoff-Chu (ZC) sequences are used for the synchronization signal.

14. The non-transitory computer-readable medium of claim 13, wherein the code further causes the processor to:
    receive an indication of a presence or a location of the DC subcarrier prior to acquisition of a cell; and
    receive the synchronization signal that is independent from the DC subcarrier, in response to the determination that the synchronization signal transmits on the DC subcarrier.

15. The non-transitory computer-readable medium of claim 13, wherein the code further causes the processor to:
    generate at least a synchronization sequence for correlation by puncturing a symbol mapped to the DC subcarrier.

16. The non-transitory computer-readable medium of claim 13, wherein the code further causes the processor to:
    generate at least a synchronization sequence without puncturing a symbol mapped to the DC subcarrier.

17. The non-transitory computer-readable medium of claim 13, wherein the determination that the synchronization signal transmits on or rate matches around the DC subcarrier is in response to a determination that one or more Zadoff-Chu (ZC) sequences are not used for the synchronization signal.

18. The non-transitory computer-readable medium of claim 13, wherein the synchronization signal is a Primary Synchronization Signal (PSS), a Secondary Synchronization Signal (SSS), or a signal transmitted on a Physical Broadcast Channel (PBCH).

* * * * *